Figure 1:
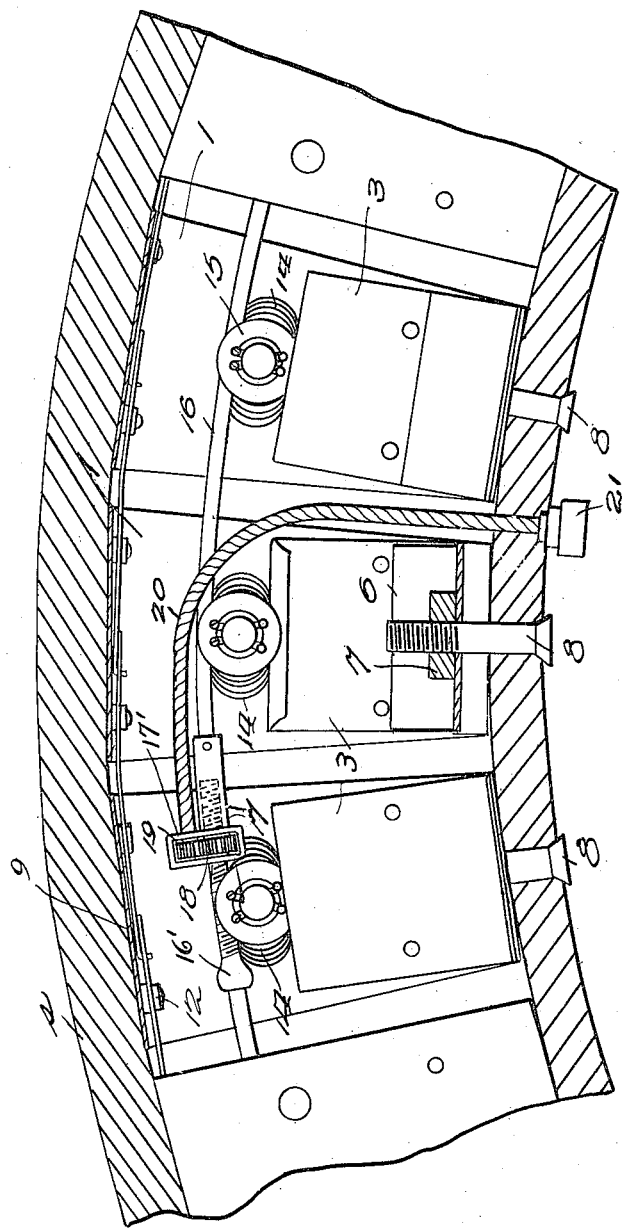

H. N. PALMER.
RESILIENT TIRE.
APPLICATION FILED JUNE 26, 1918.

1,322,608.

Patented Nov. 25, 1919.
2 SHEETS—SHEET 2.

Harold N. Palmer
Inventor

By Geo. P. Kimmel
Attorney

UNITED STATES PATENT OFFICE.

HAROLD N. PALMER, OF GRISWOLDVILLE, MASSACHUSETTS.

RESILIENT TIRE.

1,322,608.  Specification of Letters Patent.  Patented Nov. 25, 1919.

Application filed June 26, 1918. Serial No. 242,007.

*To all whom it may concern:*

Be it known that I, HAROLD N. PALMER, a citizen of the United States, residing at Griswoldville, in the county of Franklin and State of Massachusetts, have invented certain new and useful Improvements in Resilient Tires, of which the following is a specification.

This invention relates to improvements in resilient tires and it is the principal object of the invention to provide a tire having a novel form of cushioning means arranged therein for absorbing shocks or vibration imparted thereto and which can be easily and quickly adjusted to increase or decrease the resiliency thereof in order that the same can be adapted for use in connection with vehicles varying in weight and load.

Other objects will be in part obvious and in part pointed out hereinafter.

The improvements in the details and arrangement of parts will be apparent from an inspection of the accompanying drawings when considered in connection with the specific description hereinafter contained and wherein a preferred embodiment of the invention is illustrated for the purpose of imparting a full understanding thereof.

Figure 2:
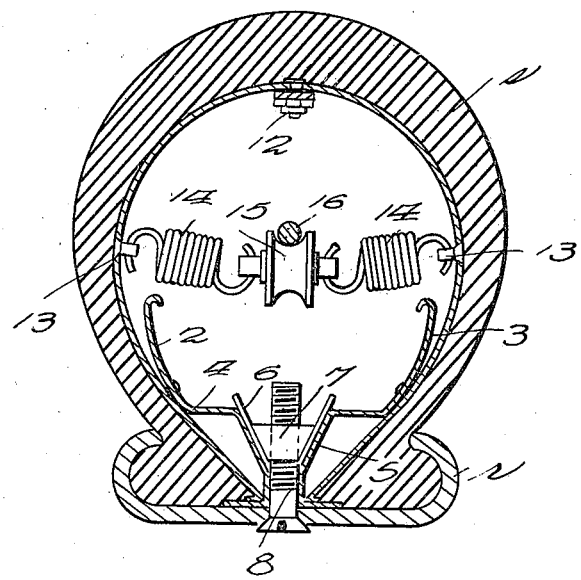
Figure 3:
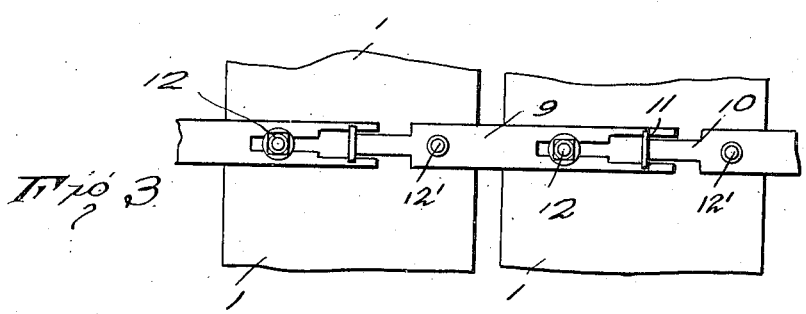
Figure 4:
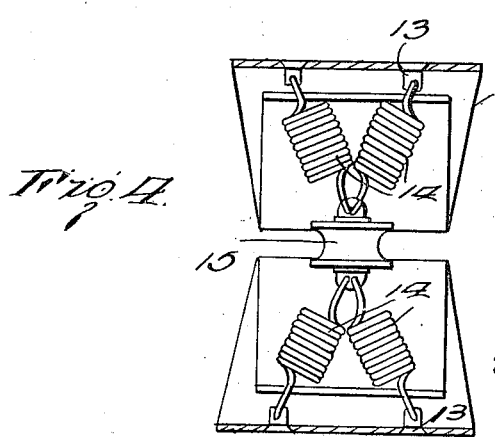

In the drawings:

Figure 1 is a fragmentary vertical longitudinal section through a tire provided with the improved cushioning means, Fig. 2 is a vertical transverse section therethrough, Fig. 3 is a fragmentary detail in plan showing the manner of interconnecting the cushioning elements and Fig. 4 is a horizontal section through one of the cushioning elements.

Referring now more specifically to the drawings, in connection with which like reference characters will designate corresponding parts throughout the several views, *s* represents the ordinary form of shoe or casing commonly used in connection with pneumatic tires and *r* the demountable rim for receiving the same.

Arranged interiorly of the shoe *s* are a plurality of springs 1, it being noted that said springs are snugly engaged in the chamber formed by the shoe. Spreading elements comprising arms 2 and 3 are arranged in the inner portions of the various spring elements 1 and as will be noted have their intermediate portions offset as at 4 while the inner portions thereof are inclined as at 5 to permit the arranging of a spreading element 6 therebetween, said element carrying a nut 7 engaged with a bolt 8 passing through an opening formed in the rim *r*, it of course being understood in this connection, that a plurality of such spreading elements together with their nuts and bolts are employed, corresponding to the number of spring elements arranged in the shoe *s*.

To inter-connect the outer portions of the spring elements 1, I provide a plurality of links 9, each reduced at one end as shown at 10 and recessed at the other end, the reduced portion of one member being received in the recess of the adjacent member.

The terminal of each reduced portion is flanged as shown at 11, to bear over the sides of the recesses. Bolts 12 are passed through the recesses of the links 9 and through portions of the spring elements 1, thereby effecting slidable connection between the links and the spring elements while rivets 12' are passed through the links and connect the outer portions of the spring elements 1 and the links. By so connecting the outer portions of the spring elements with the links it will be readily understood that disassembling of the parts for repairs and for other purposes will be materially facilitated, since the ends of the links being engaged by the bolts 12 can be readily disconnected.

Oppositely disposed eyes 13 are arranged on the inner sides of the curved spring elements 1 and are engaged by contractile coil springs 14, the adjacent ends of said springs being engaged with eyes carried on the opposite ends of pulley supporting axles, the pulleys being shown and indicated at 15. In this connection, it is of course to be understood that any number of these springs 14 can be employed for supporting the pulleys 15 with respect to their various cushioning elements, such as conditions or preference may dictate, I, however, preferably use a pair of the same on either side of each of the pulleys arranged in said cushioning elements, as clearly shown in the Fig. 4.

Arranged in the shoe *s* and trained over the various pulleys 15 supported by the cushioning elements 1 therein is a tension cable 16, to one end of which is fixedly secured a sleeve 17, the sleeves having a non-threaded bore therein. A housing 17' is carried by the sleeve while a pinion 18 is provided with a central threaded aperture designed to engage the threaded member 16' which is mounted in proximity to the sleeve 17. The pinion 19 is carried by a flexible shaft 20, the latter being passed through a suitable opening in the rim $r$ connected thereto as at 21 and by this arrangement it will be apparent that by rotating the pinion 19 the pinion 18 will in turn be rotated to consequently draw member 16' into the sleeve 17 and as the result control the actuation of the tension cable.

In using the improved wheel construction, should it be desired to decrease the resiliency of the cushioning elements 1, it is only necessary to engage a suitable form of tool with the connection 21 and to rotate the same, thus causing a rotation of the pinion 18 by the pinion 19 to insure of the drawing of member 16' into the sleeve 17. By reason of the engagement of the shank 16' with the sleeve 17, the cable 16 can be caused to contract, thus placing the pulleys 15 which are resiliently supported in the cushioning elements 1 under a greater tension, drawing the sides of said cushioning elements 1 inwardly and in this way decreasing the resiliency of the cushioning elements to the desired extent. Due to the provision of the arms 2 and 3, it of course will be understood that the cushioning elements 1 will be effectually braced at those points adjacent the same, thus lending to the efficiency and durability thereof. Obviously, the resiliency of the cushioning elements can be increased by rotating the flexible shaft 20 in an opposite direction, thus lessening the tension under which the tension cable 16 is placed and consequently permitting the pulleys 15 to be placed under less tension. In this way, my improved form of resilient tire can be effectually used in connection with vehicles differing in weight and load, permitting shock and vibration transmitted thereto during motion to be reduced to minimum.

Manifestly, the construction shown is capable of considerable modification and such modification as is within the scope of my claims, I consider within the spirit of my invention.

I claim:

1. In a resilient tire, the combination with a casing, of a plurality of spring elements therein, springs engaged with the opposite sides of the spring elements, pulleys engaged with the adjacent ends of said springs, means for moving the spring elements into engagement with the sides of the casing, and tension means adjustably engaged with said pulleys.

2. In a resilient tire, the combination with a casing, of a plurality of spring elements arranged therein, means engaged with the rim portions of said elements for spreading the same to cause them to be snugly positioned in said casing, and means connected to said spring elements for placing the same under a variable tension.

3. In a resilient tire, the combination with a casing, of a plurality of cushioning elements arranged therein, means for interconnecting said elements and permitting relative movement therebetween, other means engaged with said elements for spreading the same to effect snug arrangement thereof with said casing, and means connected to the cushioning elements for placing the same under a variable tension.

4. In a resilient tire, the combination with a casing of a plurality of cushioning elements arranged therein, bearings supported on said cushioning elements, a cable arranged over said bearings having its opposite ends adjustably connected, and a flexible shaft engaged with the adjustably connected ends for causing relative movement thereof to effect expansion or contraction of said cable.

5. In a resilient tire, the combination with a casing, of a plurality of cushioning elements arranged therein, bearing members yieldably connected to said cushioning elements, a cable passing over said bearing members, a screw threaded shank connected to one end of the cable, a sleeve connected to the opposite end of the cable for receiving said shank therein, and rotatably mounted means mounted on the sleeve and operably engaged with the shank whereby when operated the shank will be drawn into the sleeve.

In testimony whereof I affix my signature hereto.

HAROLD N. PALMER.